United States Patent [19]

Yamaoka et al.

[11] Patent Number: 5,188,875
[45] Date of Patent: Feb. 23, 1993

[54] INFORMATION RECORDING MEDIUM AND ADHESIVE COMPOSITION THEREFOR

[75] Inventors: Hideo Yamaoka; Mitsuyuki Kuroiwa; Hirosi Nanbu; Akira Todo, all of Ichihara, Japan

[73] Assignee: Mitsui Petrochemical Industries, Ltd., Tokyo, Japan

[21] Appl. No.: 571,874

[22] Filed: Aug. 24, 1990

[30] Foreign Application Priority Data

Aug. 25, 1989 [JP] Japan .................. 1-219277
Sep. 5, 1989 [JP] Japan .................. 1-229695

[51] Int. Cl.$^5$ .............................. B32B 3/00
[52] U.S. Cl. ........................ 428/64; 428/65; 428/192; 428/402; 428/412; 428/497; 428/913; 430/945; 346/76 L; 346/135.1; 369/288
[58] Field of Search ............ 428/64, 65, 192, 402, 428/412, 497; 430/945; 346/76 L, 135.1; 369/288

[56] References Cited

U.S. PATENT DOCUMENTS 5,059,462 10/1991 Kurisu et al. .................. 428/64

Primary Examiner—Patrick J. Ryan
Assistant Examiner—Elizabeth Evans
Attorney, Agent, or Firm—Sherman & Shalloway

[57] ABSTRACT

An information recording medium formed by adhering, with an adhesive composition, two disk substrates to each other, at least one of the two disk substrates having a recording layer on at least one surface of a transparent resin substrate thereof and the adhesive composition comprising
(1) the following components:
    (A) an α-olefin polymer,
    (B) an ethylene/(meth)acrylate copolymer,
    (C) a styrene-type polymer, and
    (D) a tackifier
provided that at least one of the components (A) to (D) is modified with an unsaturated carboxylic acid or a derivative thereof, or
(2) the following components:
    (A) an α-olefin polymer,
    (C) a styrene-type polymer,
    (D) a tackifier, and
    (E) fine filler particles.

29 Claims, 2 Drawing Sheets

INFORMATION RECORDING MEDIUM AND ADHESIVE COMPOSITION THEREFOR

FIELD OF THE INVENTION

This invention relates to an information recording medium and an adhesive composition therefore. More specifically, it relates to an information recording medium used as an optical disk and the like, in particular, to an information recording medium formed by adhering two disk substrates together, and an adhesive composition therefor.

BACKGROUND OF THE INVENTION

As one of plastic, information recording media in which information is written and read by focusing beams of a laser, etc., there is a so-called air sandwich-structured disk formed by adhering two disk substrates to each other through a spacer having a ring form.

And, a UV-curable adhesive, double-coated tape, ordinary-temperature curable adhesive and hot-melt adhesive are available as an adhesive for use in forming disks having such an air sandwich structure or another structure formed by adhering two disk substrates directly. In general, the UV-curable adhesive and double-coated tape have drawbacks of large deformation such as warpage, poor appearance such as cracks and pitting corrosion, and low adhesion strength. The double-coated tape also has a defect of including air between a recording medium layer and itself. The ordinary-temperature curable adhesive gives good appearance and has high adhesion strength. However, it involves a defect of large deformation, e.g. warpage.

On the other hand, the hot-melt adhesive applied by means of a roll coater, a nozzle, etc., gives good appearance and has high adhesion strength. Further, deformation such as warpage, caused by the hot-melt adhesive, is small as compared with the above adhesives, etc. Therefore, the hot-melt adhesive attracts attention as a promising one. However, when it is tested under high-temperature and high-humidity conditions (e.g. a temperature of 80° C. and a humidity of 85%) for a long period of time (e.g. 300 hours), there are problems in that deviation occurs between two disks adhered to each other and large deformation such as warpage appears. In order to prevent the deviation and deformation, it is usual practice to use a hot-melt adhesive having a high melt-viscosity. In this case, however, the problem is that the hot-melt adhesive becomes too hard at room temperature and shows a decrease in adhesion power at a temperature lower than room temperature.

SUMMARY OF THE INVENTION

It is an object of this invention to provide an information recording medium which is free from deviation between the disk substrates adhered to each other and does not suffer much deformation even when it is exposed under high-temperature and high-humidity conditions for a long period of time, and which maintains high adhesion strength even at temperature lower than room temperature.

It is another object of this invention to provide a novel adhesive composition suitable to produce the above information recording medium.

It is further another object of this invention to apply the above novel adhesive composition of this invention to production of information recording media.

The other objects and advantages of this invention will be apparent from the following description.

According to this invention, the above objects and advantages of this invention are first achieved by an information recording medium formed by adhering, with an adhesive composition, two disk substrates to each other, at least one of the two disk substrates having a recording layer on at least one surface of a transparent resin substrate thereof and the adhesive composition comprising the following components (A) to (D):

(A) an α-olefin polymer
(B) an ethylene/(meth)acrylate copolymer,
(C) a styrene-type polymer, and
(D) a tackifier provided that at least one of the components (A) to (D) is modified with an unsaturated carboxylic acid or a derivative thereof.

DETAILED DESCTIPTION OF THE INVENTION

Figure 1:
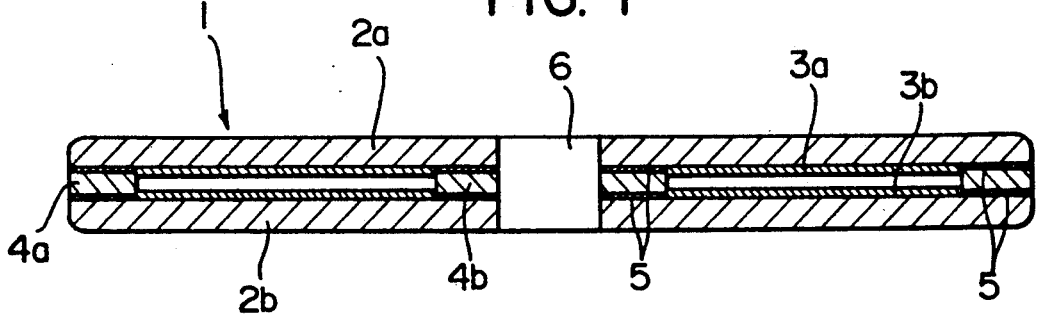
FIG. 1 is a cross sectional view of one embodiment of the information recording medium of this invention.

In this invention, at least one of the disk substrates has a structure in which a recording layer is formed on at least one surface of a transparent resin substrate. And, two of such disk substrates are adhered to each other with an adhesive directly or through a ring-form spacer with the recording layers inside. In production of the disk substrate, the transparent resin substrate material to be used are transparent thermoplastic resins of, for example, polycarbonates, polymethyl methacrylates, polyolefins, and the like. Of these resins, polyolefin resins are particularly preferred in view of adhesion strength with the adhesive. Examples of the polyolefin resins are:

(a) a copolymer of ethylene with a cycloolefin of the following formula (I)

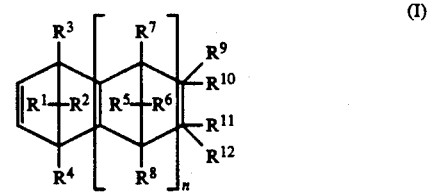

wherein $R^1$ to $R^8$ may be same or different and each is a hydrogen atom, halogen atom or hydrocarbon group, $R^9$ to $R^{12}$ may be same or different and each is a hydrogen atom, halogen atom or hydrocarbon group, or a combination of $R^9$ and $R^{10}$ or $R^{11}$ and $R^{12}$ can be a divalent hydrocarbon group and a combination of $R^9$ or $R^{10}$ and $R^{11}$ or $R^{12}$ may form a ring, and n is zero or a positive integer, provided that when n is 2 or more, a plurality of $R^5$, a plurality of $R^6$, a plurality of $R^7$ or a plurality of $R^8$ may be the same or different, the copolymer containing the cycloolefin of the above formula (I) as a polymer unit of the following formula (I-a)

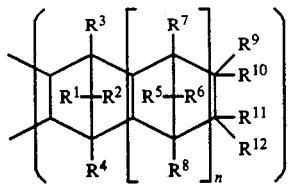

wherein $R^1$ to $R^{12}$ and n are as defined for the above formula (I), and two open lines on the left side represent bonding portions, (b) a polymer of a cycloolefin of the above formula (I) or a copolymer of ethylene with a cycloolefin of the above formula (I), the polymer or copolymer containing the cycloolefin of the above formula (I) as a polymer unit, polymerized by a ring-opening polymerization, of the following formula (I-b)

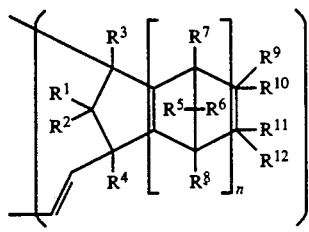

wherein $R^1$ to $R^{12}$ and n are as defined in the above formula (I), and two open lines on the left side represent bonding portions,
or a hydrogenation product thereof, and
(c) a copolymer of ethylene with a polycyclic monomer of the following formula (II)

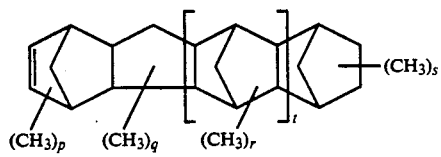

wherein p, q, r and s each 0 or 1, and t is 0 or a positive integer,
the copolymer containing the polycyclic monomer of the formula (II) as a polymer unit of the following formula (II-a)

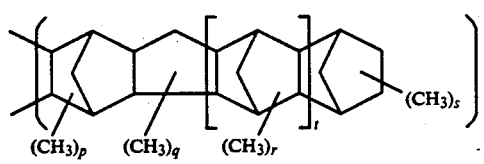

wherein p, q, r, t and s are as defined in the above formula (II).

The above copolymer (a) will be first detailed below.

In the above formula (I), each of $R^1$ to $R^8$ may be same or different and represents a hydrogen atom, halogen atom or hydrocarbon group. Examples of the halogen atom are fluorine, chlorine and bromine. Examples of the hydrocarbon group as preferred ones are lower alkyl groups such as methyl, ethyl, propyl and butyl groups.

In the above formula (I), each of $R^9$ to $R^{12}$ may be same or different and represents a hydrogen atom, halogen atom or hydrocarbon group. Examples of the halogen atom are those specified above. Examples of the hydrocarbon group are alkyl groups such as methyl, ethyl, propyl, isopropyl, butyl, isobutyl, hexyl and stearyl groups; cycloalkyl groups such as a cyclohexyl group, and the like. And, a combination of $R^9$ and $R^{10}$ or $R^{11}$ and $R^{12}$ may form a divalent hydrocarbon group, and $R^9$ or $R^{10}$ and $R^{11}$ or $R^{12}$ may together form a ring.

Examples of the divalent hydrocarbon group formed of a combination of $R^9$ and $R^{10}$ or $R^{11}$ and $R^{12}$ are alkylidene groups such as ethylidene, propylidene and isopropylidene groups.

The ring formed of $R^9$ or $R^{10}$ and $R^{11}$ or $R^{12}$ may be a single ring, a fused ring, a polycyclic ring having crosslinkage or a ring having an unsaturated bond, or may be a combination of these rings. These rings may have a substituent such as an alkyl group (e.g. methyl group), and the like.

Examples of the compound of the above formula (I) are

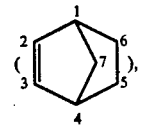

6-methylbicyclo[2,2,1]hept-2-ene,
5,6-dimethylbicyclo[2,2,1]hept-2-ene,
1-methylbicyclo[2,2,1]hept-2-ene,
6-ethylbicyclo[2,2,1]hept-2-ene,
6-butylbicyclo[2,2,1]hept-2-ene,
6-isobutylbicyclo[2,2,1]hept-2-ene,
7-methylbicyclo[2,2,1]hept-2-ene;

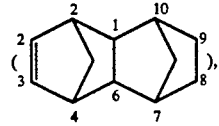

8-methyltetracyclo[4,4,0,1$^{2,5}$,1$^{7,10}$]-3-dodecene,
8-ethyltetracyclo[4,4,0,1$^{2,5}$,1$^{7,10}$]-3-dodecene,
8-propyltetracyclo[4,4,0,1$^{2,5}$,1$^{7,10}$]-3-dodecene,
8-hexyltetracyclo[4,4,0,1$^{2,5}$,1$^{7,10}$]-3-dodecene,
8-stearyltetracyclo[4,4,0,1$^{2,5}$,1$^{7,10}$]-3-dodecene,
8,9-dimethyltetracyclo[4,4,0,1$^{2,5}$,1$^{7,10}$]-3-dodecene,
8-methyl-9-ethyltetracyclo[4,4,0,1$^{2,5}$,1$^{7,10}$]-3-dodecene,
8-chlorotetracyclo[4,4,0,1$^{2,5}$,1$^{7,10}$]-3-dodecene,
8-bromotetracyclo[4,4,0,1$^{2,5}$,1$^{7,10}$]-3-dodecene,
8-fluorotetracyclo[4,4,0,1$^{2,5}$,1$^{7,10}$]-3-dodecene,
8,9-dichlorotetracyclo[4,4,0,1$^{2,5}$,1$^{7,10}$]-3-dodecene,
8-cyclohexyltetracyclo[4,4,0,1$^{2,5}$,1$^{7,10}$]-3-dodecene,
8-isobutyltetracyclo[4,4,0,1$^{2,5}$,1$^{7,10}$]-3-dodecene,
8-butyltetracyclo[4,4,0,1$^{2,5}$,1$^{7,10}$]-3-dodecene,
8-ethylidenetetracyclo[4,4,0,1$^{2,5}$,1$^{7,10}$]-3-dodecene,
8-ethylidene-9-methyltetracyclo[4,4,0,1$^{2,5}$,1$^{7,10}$]-3-dodecene,
8-ethylidene-9-ethyltetracyclo[4,4,0,1$^{2,5}$,1$^{7,10}$]-3-dodecene,
8-ethylidene-9-isopropyltetracyclo[4,4,0,1$^{2,5}$,1$^{7,10}$]-3-dodecene, 8-ethylidene-9-butyltetracyclo[4,4,0,1^{2,5},1^{7,10}]-3-dodecene.
8-n-propylidenetetracyclo[4,4,0,1^{2,5},1^{7,10}]-3-dodecene,
8-n-propylidene-9-methyltetracyclo[4,4,0,1^{2,5},1^{7,10}]-3-dodecene,
8-n-propylidene-9-ethyltetracyclo[4,4,0,1^{2,5},1^{7,10}]-3-dodecene,
8-n-propylidene-9-isopropyltetracyclo[4,4,0,1^{2,5},1^{7,10}]-3-dodecene,
8-n-propylidene-9-butyltetracyclo[4,4,0,1^{2,5},1^{7,10}]-3-dodecene,
8-isopropylidenetetracyclo[4,4,0,1^{2,5},1^{7,10}]-3-dodecene,
8-isopropylidene-9-methyltetracyclo[4,4,0,1^{2,5},1^{7,10}]-3-dodecene,
8-isopropylidene-9-ethyltetracyclo[4,4,0,1^{2,5},1^{7,10}]-3-dodecene,
8-isopropylidene-9-isopropyltetracyclo[4,4,0,1^{2,5},1^{7,10}]-3-dodecene,
8-isopropylidene-9-butyltetracyclo[4,4,0,1^{2,5},1^{7,10}]-3-dodecene,
5,10-dimethyltetracyclo[4,4,0,1^{2,5},1^{7,10}]-3-dodecene,
2,10-dimethyltetracyclo[4,4,0,1^{2,5},1^{7,10}]-3-dodecene,
11,12-dimethyltetracyclo[4,4,0,1^{2,5},1^{7,10}]-3-dodecene,
2,7,9-trimethyltetracyclo[4,4,0,1^{2,5},1^{7,10}]-3-dodecene,
9-ethyl-2,7-dimethyltetracyclo[4,4,0,1^{2,5},1^{7,10}]-3-dodecene,
9-isobutyl-2,7-dimethyltetracyclo[4,4,0,1^{2,5},1^{7,10}]-3-dodecene,
9,11,12-trimethyltetracyclo[4,4,0,1^{2,5},1^{7,10}]-3-dodecene,
9-ethyl-11,12-dimethyltetracyclo[4,4,0,1^{2,5},1^{7,10}]-3-dodecene,
9-isobutyl-11,12-dimethyltetracyclo[4,4,0,1^{2,5},1^{7,10}]-3-dodecene,
5,8,9,10-tetramethyltetracyclo[4,4,0,1^{2,5},1^{7,10}]-3-dodecene;

hexacyclo[6,6,1,1^{3,6},1^{10,13},0^{2,7},0^{9,14}]-4-heptadecene (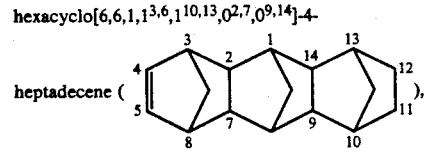), 12-methylhexacyclo[6,6,1,1^{3,6},1^{10,13},0^{2,7},0^{9,14}]-4-heptadecene,
12-ethylhexacyclo[6,6,1,1^{3,6},1^{10,13},0^{2,7},0^{9,14}]-4-heptadecene,
12-isobutylhexacyclo[6,6,1,1^{3,6},1^{10,13},0^{2,7},0^{9,14}]-4-heptadecene,
1,6,10-trimethyl-12-isobutylhexacyclo[6,6,1,1^{3,6},1^{10,13},0^{2,7},0^{9,14}]-4-heptadecene;

octacyclo[8,8,0,1^{2,9},1^{4,7},1^{11,18},1^{13,16},0^{3,8},0^{12,17}]-5-docosene (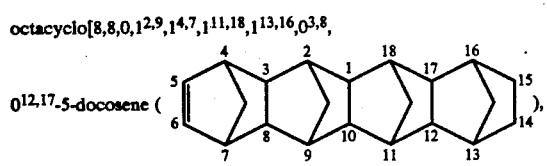), 15-methyloctacyclo[8,8,0,1^{2,9},1^{4,7},1^{11,18},1^{13,16},0^{3,8},0^{12,17}]-5-docosene,
15-ethyloctacyclo[8,8,0,1^{2,9},1^{4,7},1^{11,18},1^{13,16},0^{3,8},0^{12,17}]-5-docosene;

pentacyclo[6,6,1,1^{3,6},0^{2,7},0^{9,14}]-4-hexadecene
(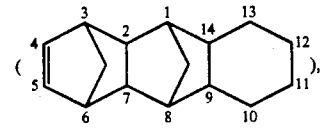), 1,3-dimethylpentacyclo[6,6,1,1^{3,6},0^{2,7},0^{9,14}]-4-hexadecene,
1,6-dimethylpentacyclo[6,6,1,1^{3,6},0^{2,7},0^{9,14}]-4-hexadecene,
15,16-dimethylpentacyclo[6,6,1,1^{3,6},0^{2,7},0^{9,14}]-4-hexadecene;

pentacyclo[6,5,1,1^{3,6},0^{2,7},0^{9,13}]-4-pentadecene
(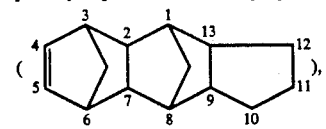), 1,3-dimethylpentacyclo[6,5,1,1^{3,6},0^{2,7},0^{9,13}]-4-pentadecene,
1,6-dimethylpentacyclo[6,5,1,1^{3,6},0^{2,7},0^{9,13}]-4-pentadecene,
14,15-dimethylpentacyclo[6,5,1,1^{3,6},0^{2,7},0^{9,13}]-4-pentadecene;

heptacyclo[8,7,0,1^{2,9},1^{4,7},1^{11,17},0^{3,8},0^{12,16}]-5-eicosene (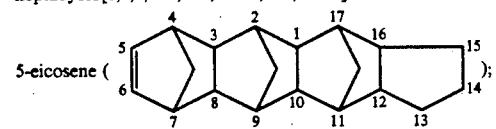);

heptacyclo-[8,8,0,1^{2,9},1^{4,7},1^{11,18},0^{3,8},0^{12,17}]-5-heneicosene (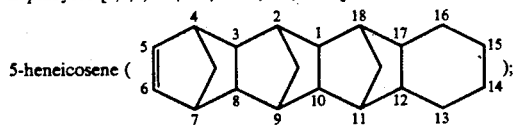);

tricyclo[4,3,0,1^{2,5}]-3-decene (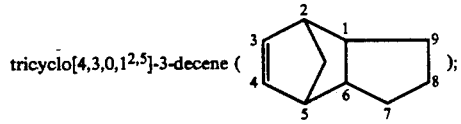);

2-methyltricyclo[4,3,0,1^{2,5}]-3-decene,
5-methyltricyclo[4,3,0,1^{2,5}]-3-decene;

tricyclo[4,4,0,1^{2,5}]-3-undecene (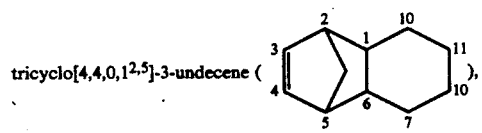), 10-methyltricyclo[4,4,0,1^{2,5}]-3-undecene, pentacyclo[6,5,1,1^{3,6},0^{2,7},0^{9,13}]-4,10-pentadecadiene (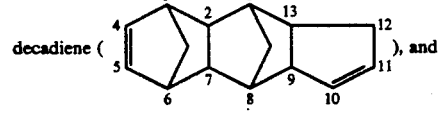), and cycloolefins of the following formula (I')

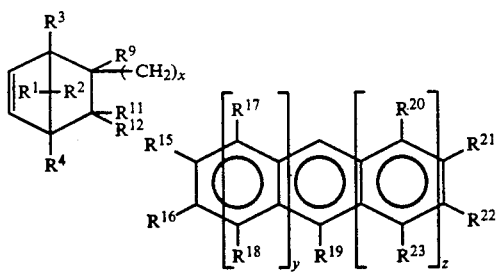

wherein $R^1$ to $R^4$, $R^9$, $R^{11}$ and $R^{12}$ are as defined for the formula (I), $R^{15}$ to $R^{22}$ may be same or different and each is a hydrogen atom, a halogen atom, an aliphatic hydrocarbon group, an aromatic hydrocarbon group or an alkoxy group, and one of $R^9$, $R^{11}$ and $R^{12}$ and one of $R^{15}$ to $R^{22}$ may combine directly or via alkylene group having 1 to 3 carbon atoms to form a ring, x is zero or an integer of 1 or above, and y and z are independently zero 1 or 2.

In the above formula (I'), each of $R^{15}$ to $R^{22}$ may be same or different and represents a hydrogen atom, a halogen atom such as fluorine, chlorine or bromine atom, an aliphatic hydrocarbon group such as methyl, ethyl, propyl, iso-propyl, butyl, iso-butyl, hexyl or stearyl group, a cycloalkyl group such as cyclohexyl group, an unsubstituted or substituted aromatic hydrocarbon group such as phenyl, tolyl, ethylphenyl, iso-propylphenyl, naphthyl or anthryl group, an aralkyl group such as benzyl or phenetyl group, and an alkoxy group such as methoxy, ethoxy or propoxy group.

In the above formula (I'), x is preferably zero, 1, 2 or 3.

Examples of the compound of the above formula (I') are 5-phenylbicyclo[2,2,1]hept-2-ene, 5-methyl-5-phenylbicyclo[2,2,1]hept-2-ene, 5-benzylbicyclo[2,2,1-]hept-2-ene, 5-tolylbicyclo[2,2,1]hept-2-ene, 5-(ethylphenyl)bicyclo[2,2,1]hept-2-ene, 5-(isopropylphenyl)-bicyclo[2,2,1]hept-2-ene, 5-(β-naphthyl)bicyclo[2,2,1-]hept-2-ene, 5-(anthracenyl)bicyclo[2,2,1]hept-2-ene, cyclopentadiene-acenaphthylene adduct

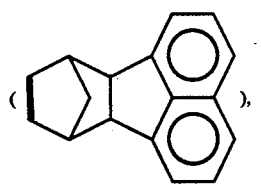

1,4-methano-1,1a,4,4a-tetrahydrofluorene

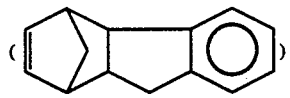

and 1,4-methano-1,4,4a,5,10,10a-hexahydroanthracene

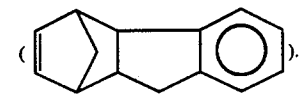

Cycloolefins of the formula (I) can be easily produced by condensing cyclopentadienes and corresponding olefins under a Diels-Alder reaction.

It should be understood that the scope of cycloolefin of the above formula (I) includes a single stereo-isomer and a mixture of stereoisomers in any proportions. Mutual conversion between stereoisomers can be made in the presence of an isomerizing catalyst.

As described above, the copolymer (a) of a cycloolefin comprises a polymer unit of the formula (I-a) derived from the cycloolefin of the formula (I) and a polymer unit of ethylene, and contains, based on these polymer units in total, preferably 15 to 60 mol %, more preferably 25 to 50 mol % of the polymer unit of the formula (I-a) and preferably 85 to 40 mol %, more preferably 75 to 50 mol % of the polymer unit of ethylene.

The copolymer (a) of a cycloolefin may contain a polymer unit derived from other copolymerizable unsaturated monomer(s) in addition to the above polymer units. Preferred as such unsaturated monomers are, e.g. α-olefins having 3 to 20 carbon atoms and monomers of hydrocarbon series having at least two carbon-carbon double bonds in the molecule. Specific examples of the α-olefins having 3 to 20 carbon atoms are propylene, 1-butene, 1-pentene, 4-methyl-1-pentene, 3-methyl-1-pentene, 1-hexene, 1-heptene, 1-octene, 1-nonene, 1-decene, 1-dodecene, 1-tetradecene, 1-hexadecene, 1-octadecene and 1-eicosene. Specific examples of the monomers of hydrocarbon series having at least two carbon-carbon double bonds in the molecule are linear nonconjugated dienes such as 1,4-hexadiene, 1,6-octadiene, 2-methyl-1,5-hexadiene, 4-methyl-1,5-hexadiene, 5-methyl-1,5-hexadiene, 6-methyl-1,5-heptadiene, and 7-methyl-1,6-octadiene; cyclic nonconjugated dienes such as cyclohexadiene, dicyclopentadiene, methyltetrahydroindene, 5-vinyl-2-norbornene, 5-ethylidene-2-norbornene, 5-methylene-2-norbornene, 5-isopropylidene-2-norbornene, 6-chloromethyl-5-isopropenyl-2-norbornene, and 4.9,5.8-dimethano-3a,4,4a,5,8,8a,9,9a-octahydro-1H-benzoidene; 2,3-diisopropylidene-5-norbornene; 2-ethylidene-3-isopropylidene-5-norbornene; and 2-propenyl-2,2-norbornadiene. Of these monomers, preferred are 1,4-hexadiene, 1,6-octadiene and cyclic nonconjugated dienes, especially, such as dicyclopentadiene, 5-ethylidene-2-norbornene, 5-vinyl-2-norbornene, 5-methylene-2-norbornene, 1,4-hexadiene and 1,6-octadiene.

The amount of the polymer unit derived from these other unsaturated monomers is 15 mol % at most, more preferably 10 mol % at most, based on the polymer units derived from the formula (I-a) and ethylene in total.

The copolymer (a) is substantially a linear random copolymer. That the copolymer (a) has no gell-like crosslinked structure can be confirmed by the fact that it is completely dissolved in decalin at 135° C.

The above cycloolefin-containing random copolymer (a) has an intrinsic viscosity [η], measured in decalin at 135° C., preferably of 0.01 to 10 dl/g, more preferably of 0.05 to 5 dl/g, a softening temperature (TMA), measured with a thermomechanical analyzer, preferably of not less than 70° C., more preferably of 90° to 250° C., further preferably of 100° to 200° C., a glass transition point (Tg) preferably of 50° to 230° C., more preferably of 70° to 210° C., and a crystallinity, measured by X-ray diffractometry, preferably of 0 to 10%, more preferably of 0 to 7%, particularly preferably of 0 to 5%.

As the above cycloolefin-containing random copolymer (a), a copolymer having the above-specified properties is preferred. However, the above cycloolefin-containing random copolymer (a) may contain some other copolymer having properties outside the above-specified ranges, e.g. a cycloolefin-containing random copolymer having a softening point of less than 70° C., specifically between −10° C. and 60° C., and an intrinsic viscosity [η], measured in decalin at 135° C., of 0.05 to 5 dl/g. The physical properties of the resulting copolymer as a whole are naturally preferably within the above-specified ranges.

The above cycloolefin-containing random copolymer (a) can be produced according, e.g. to processes proposed by the present Applicant in Japanese Laid-Open Patent Publications Nos. Sho 60-168708, 61-120816, 61-115912, 61-115916, 61-271308, 61-272216, 62-252406 and 62-252407.

Copolymers included in the scope of the above cycloolefin-containing copolymer (a) may be used alone or in combination.

The above copolymer (b) and hydrogenation products thereof will be explained below.

In the copolymer (b), the cycloolefin of the formula (I) is contained in a form of the ring-opening polymerization polymer unit of the formula (I-b).

Examples of the cycloolefin of the formula (I) for the copolymer (b) are those described with regard to the copolymer (a).

The copolymer (b) contains, based on the ring-opening polymerization polymer unit of the formula (I-b) and the polymer unit of ethylene in total, preferably 50 to 100 mol %, more preferably 75 to 100 mol % of the polymer unit of the formula (I-b) and preferably 0 to 50 mol %, more preferably 25 to 50 mol %, especially preferably 35 to 50 mol %, of the polymer unit of ethylene.

The copolymer (b) may contain a polymer unit derived from other copolymerizable unsaturated monomers as required.

Such unsaturated monomers are cycloolefins of the following formula (III)

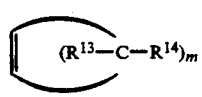

(III)

wherein $R^{13}$ and $R^{14}$ may be same or different from each other and each is a hydrogen atom, a halogen atom or a hydrocarbon group, m is an integer of not less than 2, and a plurality of $R^{13}$'s and $R^{14}$'s may be the same or different.

Examples of such cyloolefins are cyclomonoolefins such as cylobutene, cyclopentene, cycloheptene, cyclooctene, cyclononene, cyclodecene, methylcyclopentene, methylcycloheptene, methylcyclooctene, methylcyclononene, methylcyclodecene, ethylcyclopentene, ethylcycloheptene, ethylcyclooctene, ethylcyclononene, ethylcyclodecene, dimethylcyclopentene, dimethylcycloheptene, dimethylcyclooctene, dimethylcyclononone, dimethylcyclodecene, and trimethylcyclodecene; and cyclodiolefins such as cyclooctadiene and cyclodecadiene.

The amount of the polymer unit derived from the other cycloolefins is 50 mol % at most, preferably 25 mol % at most, on the basis of the total amount of the polymer unit of the formula (I-b) and the polymer unit derived from ethylene.

The above copolymer (b) formed by ring-opening polymerization of a cycloolefin has an intrinsic viscosity [η], measured in decalin at 135° C., preferably of 0.05 to 10 dl/g, more preferably of 0.08 to 5 dl/g and a softening temperature (TMA) preferably of not less than 70° C., more preferably of 90° to 300° C.

Further, the above polymer (b) formed by ring-opening polymerization of a cycloolefin has a crystallinity, measured by X-ray diffractometry, preferably of 0 to 10 %, more preferably of 0 to 7%, particularly preferably of 0 to 5%.

A ring-opening polymerization polymer which contains the cycloolefin component of the formula (I) can be produced by subjecting a monomer of the formula (I) to an ordinary ring-opening polymerization method. Examples of the polymerizing catalyst used therefor are catalyst systems consisting of a halide, nitrate or acetylacetone compound of ruthenium, rhodium, palladium, osmium, iridium, platinum, molybdenum, tungsten or the like, and a reducing agent such as an organic tin compound or alcohol, and catalyst systems consisting of a halide or acetylacetone compound of titanium, vanadium, zirconium, tungsten, molybdenum or the like and an organoaluminum compound.

The molecular weight of the resulting ring-opening polymerization polymer may be adjusted by incorporating an olefin, etc. at a ring-opening polymerization time.

The ring-opening polymerization polymer obtained as above may be hydrogenated according to a usual hydrogenation method. For the hydrogenation, hydrogenating catalysts usually used for hydrogenation of olefin compounds can be used. Specifically, there are heterogeneous catalysts and homogeneous catalysts. Examples of the heterogeneous catalysts are nickel, palladium, platinum and solid catalysts in which these metals are deposited on a support (e.g. carbon, silica, diatomaceous earth, alumina or titanium oxide) such as nickel/silica, nickel/diatomaceous earth, palladium/carbon, palladium/silica, palladium/diatomaceous earth, and palladium/alumina. Examples of the homogeneous catalysts are those prepared by using, as a support, a metal belonging to the group VIII of the periodic table, e.g. catalysts formed of a Ni or Co compound such as nickel naphthenate/triethylaluminum, cobalt octenate/n-butyllithium, nickel acetylacetonate/triethylaluminum or the like and an organometallic compound of a metal belonging to the groups I to III of the periodic table, or a Rh compound.

The above hydrogenation of the ring-opening polymerization polymer is carried out in a homogeneous or heterogeneous system depending upon the catalyst and under a hydrogen pressure preferably of 1 to 150 atm at a temperature preferably between 0° C. and 180° C., more preferably between 20° C. and 100° C. The hydrogenation ratio can be adjusted according to hydrogen pressure, reaction temperature, reaction time and catalyst concentration.

The copolymer (c) will be explained below.

In the copolymer (c), the cyloolefin of the formula (II) is contained in a form of a polymer unit of the formula (II-a).

Typical examples of the cycloolefin of the formula (II) are 1,4,5,8-dimethano-1,2,3,4,4a,4b,5,8,8a,9a-decahydrofluorenes (to be referred to as DMDF's hereinafter) of the following formula (II').

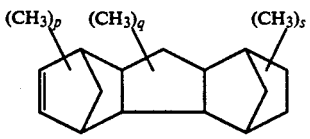
(II')

wherein p, q and s are as defined above.

Japanese Laid-Open Patent Publication No. Sho 52-62192 describes such DMDF's as one component of a dihydrotricyclopentadiene mixture obtained by hydrogenation of two kinds of isomers of tricyclopentadiene. The DMDF's can be produced by a Diels-Alder reaction between 4,7-methano-3a,5,6,7a-tetrahydro-1H-indenes which are partially hydrogenated products of dicyclopentadienes and cyclopentadienes or a Diels-Alder reaction between 4,7-methano-3a,5,6,7a-tetrahydro-1H-indenes and dicyclopentadienes which can form cyclopentadienes by thermal decomposition under conditions of the reaction.

The partially hydrogenated products of dicyclopentadienes can be easily produced from dicyclopentadienes as starting materials according to a known method disclosed, e.g. in East German Patent 0154293.

Examples of the polycyclic monomer of the formula (II) other than the DMDF's are as follows.

Heptacyclo[1$^{3,6}$,1$^{10,17}$,1$^{12,15}$,0,0$^{2,7}$0$^{11,16}$]-eicos-4-ene (

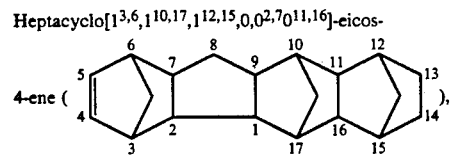

),

Methylheptacyclo[1$^{3,6}$,1$^{10,17}$,1$^{12,15}$,0,0$^{2,7}$0$^{11,16}$]- eicos-4-ene (
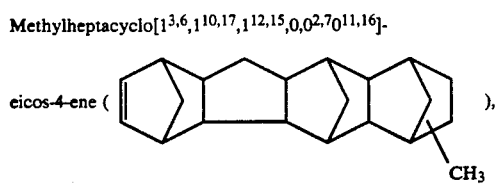
),

Dimethylheptacyclo[1$^{3,6}$,1$^{10,17}$,1$^{12,15}$,0,0$^{2,7}$0$^{11,16}$]- eicos-4-ene (
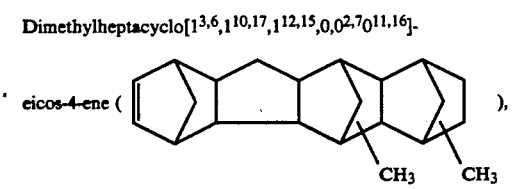
),

Trimethylheptacyclo[1$^{3,6}$,1$^{10,17}$,1$^{12,15}$,0,0$^{2,7}$

0$^{11,16}$]-eicos-4-ene (
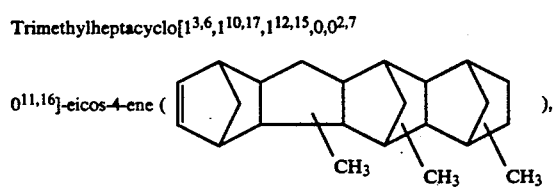
),

Tetramethylheptacyclo[1$^{3,6}$,1$^{10,17}$,1$^{12,15}$,0,0$^{2,7}$

0$^{11,16}$]-eicos-4-ene (
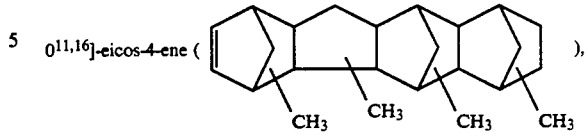
),

Nonacyclo[1$^{1,11}$,1$^{5,8}$,1$^{13,20}$,1$^{15,18}$,0$^{2,10}$,0$^{4,9}$,0$^{12,21}$,0$^{14,19}$]-eicos- 6-ene (
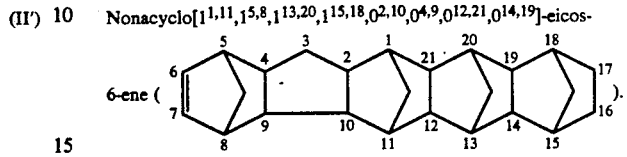
).

These polycyclic monomers can be also produced by a Diels-Alder reaction, etc.

The copolymer (c) contains, on the basis of the total amount of the polymer unit of the formula (II-a) derived from the cycloolefin of the formula (II) and the polymer unit derived from ethylene, preferably 10 to 90 mol %, more preferably 20 to 80 mol % of the polymer unit of the formula (II-a) and preferably 90 to 10 mol %, more preferably 80 to 20 mol % of the polymer unit derived from ethylene.

The copolymer (c) may contain, as required, polymer unit(s) derived from other copolymerizable unsaturated monomers.

As the above unsaturated monomers, there are mixtures (to be referred to as "TCPD mixture" hereinafter) of tricyclopentadienes of the following formula (IV)

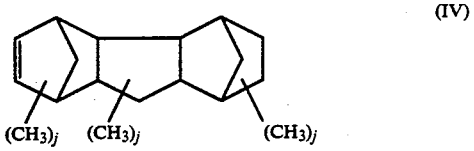
(IV)

wherein j is 0 or 1,
with tricyclopentadienes of the following formula (V)

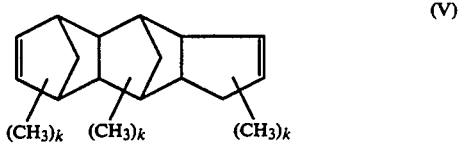
(V)

wherein k is 0 or 1.

The mixing ratio between the above monomers (polycyclic monomer of the formula (IV)/polycyclic monomer of the formula (V)) is preferably 5/95 to 20/80 by mole.

The TCPD mixture can be produced from a dicyclopentadiene as a starting material according to a method described, e.g. in Japanese Laid-Open Patent Publication No. Sho 49-49952. These tricyclopetadienes are formed as a by-product in the production of DMDF's of the general formula (II'), and can be advantageously used without separating the tricyclopentadienes from DMDF's.

In a copolymer formed of ethylene, a polycyclic monomer of the general formula (II) (DMDF's of the general formula (II') in particular) and at least one tricyclopentadiene (to be referred to as "TCPD" hereinafter) selected from TCPD's of the general formulae (IV)

and (V), the ethylene/DMDF's molar ratio is 10/90 to 90/10, preferably 20/80 to 80/20, and the TCPD's/DMDF's molar ratio is 4 or less, preferably 15/85 to 80/20, more preferably 20/80 to 50/50.

Other examples of the polymerizable unsaturated monomers are linear or branched α-olefins having 3 to 10 carbon atoms and cycloolefins having 5 to 18 carbon atoms.

Specific examples of the α-olefins are propylene, 1-butene, 1-hexene, 3-methyl-1-butene, 4-methyl-1-pentene, 1-octene and 1-decene. Of these, α-olefins having 3 to 6 carbon atoms are preferred.

Specific examples of the cycloolefins are cyclopentene and cyclohexene.

In a copolymer formed of ethylene, a polycyclic monomer (DMDF's of the general formula (II') in particular) and the above α-olefin and/or cycloolefin, the ethylene/DMDF's molar ratio is 10/90 to 90/10, preferably 20/80 to 80/20, and the (α-olefin and/or cycloolefin)/DMDF's molar ratio is not more than 9, preferably 90/10 to 15/85, more preferably 80/20 to 25/75.

Another examples of the polymerizable unsaturated monomers are styrenes such as styrene and α-methylstyrene; norbornene, methylnorbornene and ethylnorbornene; norbornene-type compounds such as 4,7-methano-3a,5,6,7a-tetrahydro-1H-indene and 4,7-methano-2,3,3a,7a-tetrahydro-1H-indene; polyenes such as dicyclopentadiene, 5-ethylidene-2-norbornene and 1,4-hexadiene, and the like.

It is preferable to use these unsaturated monomers in such an amount that is less than 15 mol % based on the polycyclic monomer of the formula (II).

The copolymer (c) can be produced, e.g. according to a method disclosed in International Publication No. WO 89/01950. For example, it can be produced by copolymerizing ethylene, a polycyclic monomer of the general formula (II) and, optionally, other monomer(s) in a hydrocarbon solvent in the presence of a catalyst composed of a hydrocarbon-soluble vanadium compound and a halogen-containing organoaluminum compound.

In the copolymer (c), the polycyclic monomer of the formula (II) is contained mainly in a form of the polymer unit of the formula (II-a) as described above. The copolymer (c) does not substantially contain any polymer unit of the following formula (VI), derived from ring-opening polymerization of the polycyclic monomer of the formula (II)

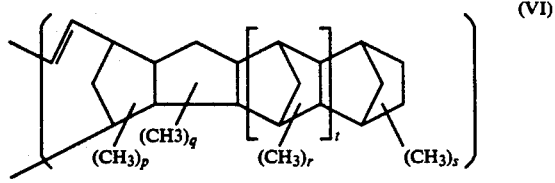

(VI)

wherein p, q, r, s and t are as defined above.
Even if such a polymer unit is contained, its amount is very small. This is why the copolymer (c) is chemically stable.

The transparent resin substrate can be formed from the above-specified thermoplastic resin according to a usual method such as injection molding. Transparent resin substrate having a desired form can be easily obtained according to such a method.

The recording layer formed on at least one surface of the transparent resin substrate has a constitution known per se. For example, it is constituted of an optical memory material layer of a recording material for heat mode, for example, a metal material having low melting point such as Te and the like, a recording material mainly comprising the said low melting point metal material (e.g. Te-C-H recording material, Te-Cr-C-H recording material, etc.) and an organic dyestuff; and a magnetoptical recording material containing a rare earth element and 3 d transition metal (e.g. TbFeCo or a mixture of TbFeCo with Pt and/or Pd), and as required, further, an undercoat layer optionally stacked on or/and beneath the optical memory material layer, such as an antireflection layer, a reflection layer, an optical interference layer, a protective layer and/or an enhancing layer.

The transparent resin substrate having a recording layer on at least one surface can be used as a disk substrate in this invention. And, two of these disk substrates are adhered to each other directly or through a ring-form spacer, using an adhesive composition.

As a material for the ring-form spacer, it is possible to use the same thermoplastic resins as those used for the above transparent resin substrate, such as polycarbonate, polymethyl methacrylate and polyolefins. A filler such as $TiO_2$, $SiO_2$ or the like may be incorporated into these resin to form the spacer.

The adhesive composition for use in the information recording medium of this invention comprises, as described previously,
(A) an α-olefin polymer,
(B) an ethylene/(meth)acrylate copolymer,
(C) a styrene-type polymer, and
(D) a tackifier,
provided that at least one member of the above components (A) to (D) is modified with an unsaturated carboxylic acid or a derivative thereof. This composition is a so-called hot-melt adhesive which is melted at an elevated temperature and cured by cooling it. It is therefore used when melted at a high temperature.

Usable as the above α-olefins polymer (A) are homo- or copolymers of α-olefins having 2 to 20 carbon atoms. Preferred examples of the α-olefin polymer are an ethylene/propylene copolymer, a propylene polymer and an isobutylene polymer.

In this invention, it is preferable to use a mixture of an ethylene/propylene copolymer, a propylene polymer and an isobutylene polymer as an α-olefin polymer (A).

The ethylene/propylene copolymer, which is not modified yet with an unsaturated carboxylic acid or its derivative (hereinafter, referred to as "unmodified"), preferably comprises, based on the total amount of the polymer units of ethylene and propylene, 5 to 80% by weight, particularly 5 to 50% by weight of the polymer unit of ethylene and 95 to 20% by weight, particularly 95 to 50% by weight of propylene.

The unmodified ethylene/propylene copolymer has a melt-flow rate (ASTM D-1238) preferably of 0.1 to 100 g/10 minutes, more preferably of 0.5 to 50 g/10 minutes.

The unmodified ethylene/propylene copolymer has an intrinsic viscosity [η], measured in decalin at 135° C., preferably of 0.1 to 6.0 dl/g, more preferably of 0.2 to 4.5 dl/g.

Preferred as the unmodified propylene polymer are a homopolymer of propylene or a copolymer of propylene with ethylene or an α-olefin having 4 to 20 carbon atoms. Examples of the α-olefin having 4 to 20 carbon atoms are 1-butene, isobutylene, 4-methylpentene-1, 1-hexene, 1-heptene, 1-octene, 1-nonene, 1-decene, 1-dodecene, 1-tetradecene, 1-hexadecene, 1-octadecene and 1-eicosene. In the case of copolymer, it is preferable that the content of ethylene or α-olefin is 20% by weight or less.

Such a propylene polymer has a melt flow rate (ASTM D-1238) preferably of 1 to 100 g/10 minutes, more preferably of 1 to 50 g/10 minutes.

Preferred as the unmodified isobutylene polymer (polyisobutylene) are a homopolymer of isobutylene or a copolymer of isobutylene with ethylene. The unmodified isobutylene polymer has a number average molecular weight preferably of 500,000 or less, more preferably of 2,000 to 300,000.

Acrylate or methacrylate used for the unmodified ethylene/(meth)acrylate copolymer (B) is an ester of acrylic acid or methacrylic acid with a hydrocarbon having 1 to 12 carbon atoms. Specific examples of the ethylene/(meth)acrylate copolymer include ethylene/ethyl acrylate copolymer, ethylene/methyl acrylate copolymer, ethylene/ethyl methacrylate copolymer, and ethylene/methyl methacrylate copolymer. Ethylene/ethyl acrylate copolymer is especially preferred in this invention.

The unmodified ethylene/(meth)acrylate copolymer (B) preferably comprises, based on the total amount of the polymer units of ethylene and (meth)acrylate, 99 to 50% by weight, particularly 95 to 70% by weight of the polymer unit of ethylene and 1 to 50% by weight, particularly 5 to 30% by weight of the polymer unit of (meth)acrylate.

The ethylene/(meth)acrylate copolymer (B) has a melt flow rate (JIS K 6730) preferably of 0.1 to 300 dg/minute, more preferably of 1 to 100 dg/minute.

The styrene-type polymer (C) is a polymer containing at least one unit selected from the styrene unit and its derivative unit as one unit of polymer structure in the polymer chain. Examples of such a styrene-type polymer (C) are polystyrene, a styrene/butadiene rubber, a styrene/butadiene/styrene block copolymer (SBS copolymer) and a hydrogenation product of a styrene/butadiene/styrene block copolymer or styrene/butadiene rubber (SEBS copolymer), a styrene/acrylonitrile copolymer, a styrene/α-methylstyrene copolymer, a styrene/maleic anhydride copolymer, a styrene/methyl methacrylate copolymer, a styrene/α-methylstyrene/acrylonitrile copolymer, a styrene/acrylonitrile/methyl methacrylate copolymer, a styrene/maleic anhydride/acrylonitrile copolymer, a styrene/N-phenylmaleimide copolymer and blends of these polymers with rubbery elastomers. Examples of the rubbery elastomers are polybutadiene and acrylic rubbers. Examples of the blends of the above polymers with the rubbery elastomers are accordingly an ABS resin, AES resin and AAS resin.

Such a styrene-type polymer (C) has a melt flow rate (ASTM D-1238; 230° C. x a load of 2.16 kg) preferably of 0.05 to 100 g/10 minutes, more preferably of 0.1 to 50 g/10 minutes.

The unmodified styrene-type polymer has a glass transition point (Tg) preferably of 50° to 200° C., more preferably of 70° to 150° C.

Further, preferred as the unmodified tackifier (D) are, for example, rosin and its derivatives, terpene-containing resins, aromatic petroleum resins, aliphatic cyclic resins (aliphatic resin having a carbon ring in the polymer structure) such as cyclopentadiene-type polymers, dicyclopentadiene-type polymers, hydrocarbon resins (petroleum resins) having a carbon ring in the polymer structure. Preferred examples of the rosin derivatives are a hydrogenation product and esterification product of rosin. Preferred examples of the cyclopentadiene polymer are a homopolymer of cyclopentadiene and a copolymer produced from cyclopentadiene as a main monomer component. Preferred examples of the dicyclopentadiene polymer are a homopolymer of dicyclopentadiene and a copolymer produced from dicyclopentadiene as a main monomer component. Preferred examples of the hydrocarbon resins (petroleum resins) having a carbon ring in the polymer structure are resins obtained by copolymerizing cyclopentadiene and/or dicyclopentadiene with an olefin or diolefin having 4 and/or 5 carbon atoms, or aliphatic petroleum resins obtained by polymerizing the fraction containing $C_5$-aliphatic olefin (e.g. 2-methyl-1-butene and/or 2-methyl-2-butene) and/or $C_5$-aliphtic diolefin (e.g. isoprene and/or piperirene) in the presence of a cationic catalyst (e.g. a Friedel-Craft catalyst), or petroleum resins obtained bt polymerizing $C_4$ or $C_4$-$C_5$ fractions in the presence of the cationic catalyst. Among these compounds, the aliphatic cyclic resins are most preferable as the tackifier in this invention. Furthermore, of the aliphatic cyclic resins, especially preferable are the petroleum resins having a carbon ring in the polymer structure, particularly aliphatic petroeum resins.

The aliphatic cyclic resin (D) has a number average molecular weight preferably of not more than 5,000, more preferably of 50 to 3,000, especially preferably 300 to 3,000, and has preferably a softening point (ring and ball method) of 30° to 120° C., more preferably of 70° to 120° C. The aliphatic petroleum resin, which is the most preferred aliphatic cyclic resin, has a number average molecular weight of preferably 300 to 2,000 and a softening point (ring and ball method) of 30° to 120° C., more preferably of 70° to 120° C.

In the present invention, the component (D) is to be those different from the components (A) to (C).

In the adhesive composition used in this invention, at least one of the components (A) to (D) is required to be modified with an unsaturated carboxylic acid or its derivative. The modification with an unsaturated carboxylic acid or its derivative may be copolymerization or graft-modification of any one polymer of the components (A) to (D). Graft-modification is preferred. Examples of the unsaturated carboxylic acid and its derivative are unsaturated carboxylic acids such as acrylic acid, methacrylic acid, maleic acid, fumaric acid, tetrahydrophthalic acid, itaconic acid, citraconic acid, crotonic acid, isocrotonic acid, and Nadic acid ® (endo-cis-bicyclo[2,2,1]hept-5-ene-2,3-dicarboxylic acid); acid halides, amides, imides, anhydrides, esters, such as malenyl chloride, maleimide, itaconic anhydride, maleic anhydride, citraconic anhydride, monomethyl maleate, dimethyl maleate and glycidyl maleate; and the like. Of these, unsaturated dicarboxylic acids or anhydrides thereof are preferred, and maleic acid or its anhydride is particularly preferred.

When the unsaturated carboxylic acid or its derivative is grafted on at least one of the components (A) to (D), a variety of methods known per se can be employed. For example, the grafting can be carried out as follows. The polymer and the unsaturated carboxylic acid or its derivative in an amount required therefor are dissolved in a suitable solvent, e.g. toluene, xylene, or the like, and, for example, a radical initiator of an organic peroxide, e.g. benzoyl peroxide, lauryl peroxide or dicumyl peroxide, or a radical initiator such as azobisnitrile is added to the resultant solution. Then, the resultant solution is heated at a temperature not lower than the decomposition temperature of the radical initiator, usually at a temperature between 50° C. and 300° C. for 1 minute to 5 hours. The grafting can be also carried out by directly adding the unsaturated carboxylic acid or its derivative as a graft monomer and a radical initiator to the polymer in a molten state and kneading the resultant mixture at a temperature not lower than the melting temperature of the polymer, usually for 1 minute to 5 hours.

The amount of the unsaturated carboxylic acid or its derivative component in the modified polymer is preferably 0.01 to 5% by weight. The amount of the unsaturated carboxylic acid or its derivative remaining unreacted in the modified polymer is preferably not more than 50 ppm.

Due to the modification with the unsaturated carboxylic acid or its derivative, polarity of the adhesive composition can be increased while its glass transition point is maintained, whereby the adhesive composition can be imparted with high adhesion power even at a high temperature without impairing its high adhesion power at a low temperature.

In this invention, it is desirable that the component to be modified with the unsaturated carboxylic acid or its derivative is the α-olefin polymer (A).

The above adhesive composition preferably contains 1 to 68% by weight, more preferably 1 to 60% by weight, of the α-olefin polymer (A), 1 to 30% by weight of the ethylene/(meth)acrylate copolymer (B), 1 to 30% by weight of the styrene-type polymer (C) and 30 to 95% by weight of the tackifier (D). More preferably, it contains 5 to 50% by weight of the α-olefin polymer (A), 5 to 20% by weight of the ethylene/(meth)acrylate copolymer (B), 5 to 20% by weight of the styrene-type polymer (C) and 35 to 70% by weight of the tackifier (D).

In the above adhesive composition of this invention, the α-olefin polymer (A) is preferably a mixture of an ethylene/propylene copolymer, a propylene copolymer and an isobutylene polymer as described previously. In this case, the α-olefin polymer (A) component preferably contains 1 to 60% by weight, more preferably 5 to 40% by weight, of an ethylene/propylene copolymer, 1 to 60% by weight, more preferably 5 to 40% by weight, of a propylene copolymer and 1 to 30% by weight, preferably 5 to 20% by weight, of an isobutylene polymer with the proviso that the total amount of these three subcomponents does not exceed 68% by weight.

The adhesive composition of this invention is a hot-melt adhesive composition, and preferably has a melt-viscosity, at 170° C., of 20,000 to 200,000 cps, preferably 2,000 to 150,000 cps (measured at a shear rate of 17.6 sec$^{-1}$ by using an Emila rotary viscometer). When the melt-viscosity exceeds the above upper limit of 200,000 cps, operationability of the adhesive composition in nozzle emission or roll-coating is apt to be undesirably degraded. The softening point of the adhesive composition of the invention is preferably not less than 120° C., more preferably 140° to 200° C.

The above adhesive composition of this invention may contain additives such as a filler in addition to the above components (A) to (D). Inorganic and organic fillers may be used. Preferably usable are fillers for usual plastics such as clay, silica, mica, talc, calcium carbonate, alumina, titanium oxide, carbon black, graphite, and the like. The particle diameter of the filler is preferably not more than 100 μm, particularly preferably not more than 10 μm, although it is not specially limited. The amount of the filler is usually 1 to 100 parts by weight based on 100 parts by weight of the adhesive composition. The filler is homogeneously dispersed in the adhesive composition.

Since the adhesive composition of this invention comprises components (A), (B), (C) and (D) and at least one component of the components (A) to (D) is modified with an unsaturated carboxylic acid or its derivative, the adhesive composition of this invention is excellent in thermal resistance and adhesiveness under high- and low-temperatures.

According to the study by the present inventors, the following has been clearly found. An adhesive composition containing the above fine particles of the filler exhibits performance equivalent to that of the above-specified adhesive composition, even if it does not contain the above component (B) i.e. an ethylene/(meth)acrylate copolymer and is not modified with a carboxylic acid or its derivative.

According to this invention, therefore, there is secondly provided an information recording medium formed by adhering two disk substrates to each other, at least one of the two disk substrates having a recording layer on at least one surface of a transparent resin substrate thereof, using an adhesive composition, and the adhesive composition comprising:

(A) an α-olefin polymer,
(C) a styrene-type polymer,
(D) a tackifier, and
(E) fine filler particles.

It should be understood that the foregoing explanation with regard to the components (A), (C), (D) and (E) and the information recording medium is also applicable to the above recording medium of the second invention unless otherwise particularly explained hereinafter.

The above adhesive composition preferably comprises 1 to 68% by weight, preferably 1 to 60% by weight, of the α-olefin polymer (A), 1 to 30% by weight of the styrene-type polymer (C), 30 to 95% by weight of the tackifier (D) and 1 to 50% by weight of the fine filler particles (E). More preferably, it comprises 1 to 60% by weight, more preferably 5 to 50% by weight, of the α-olefin polymer (A), 5 to 20% by weight of the styrene-type polymer (C), 45 to 90% by weight of the tackifier resin (D) and 5 to 35% by weight of the fine filler particles (E).

In the above adhesive composition of this invention, the α-olefin polymer (A) is similarly preferably a mixture of an ethylene/propylene copolymer, a propylene copolymer and an isobutylene polymer as described previously. In this case, the α-olefin polymer (A) component preferably contains 1 to 60% by weight, more preferably 5 to 40% by weight, of an ethylene/propylene copolymer, 1 to 60% by weight, preferably 5 to 40% by weight, of a propylene copolymer and 1 to 30% by weight, preferably 5 to 20% by weight, of an isobutylene polymer with the proviso that the total amount of these three subcomponents does not exceed 60% by weight.

The above α-olefin polymer (A), the styrene-type polymer (C) or the tackifier (D) may be optionally modified with an unsaturated carboxylic acid or its derivative.

The above filler-containing adhesive composition of this invention preferably has a melt-viscosity, at 170° C., of 30,000 to 100,000 cps (measured at a shear rate of 17.6 sec$^{-1}$ by using an Emila rotary viscometer). The melt-viscosity of the adhesive composition comprising the components (A), (C) and (D) before incorporation of the fine filler particles (E) is preferably at least 20,000 cps.

Each of the information recording media of this invention is produced by applying any one of the above adhesive compositions to (one of) the above disk substrates with a roll coater or a nozzle and adhering them to each other. An information recording medium with a spacer between the disk substrates is produced by attaching a ring-form spacer to a disk substrate before hardening of the coating composition, then hardening the coating composition, applying the above adhesive composition to the ring-form spacer in the same manner, and adhering another disk substrate. In general, the information recording medium is produced by further inserting and attaching a hub.

In this invention, the scope of the information recording medium includes all of recording media having an information-recording layer such as optical disks, flexible optical disks.

The information recording medium of this invention is produced by adhering a disk substrate having a recording layer to another disk substrate having a recording layer with the recording layers inside directly or through a ring-form spacer while the adhesive composition is applied thereto.

Information recording media produced as above have not only excellent heat resistance but also adhesive strength at a temperature lower than ordinary temperature, because the above adhesive compositions of the first and second inventions are used to adhere the disk substrates or the disk substrate and the ring-form spacer. Therefore, even when the information recording media are used under high-temperature, high-humidity conditions and low-temperature environmental conditions for a long period of time, neither deviation nor peeling occurs between the disk substrates, and deformation such as warpage is minimized.

This invention will be explained by reference to Examples and drawings.

FIG. 1 is a cross sectional view of one embodiment of the information recording medium of this invention, in which numeral 1 indicates an information recording medium. Two disk substrates 2a and 2b are adhered to each other with recording layers 3a and 3b inside through ring-form spacers 4a and 4b with an adhesive layer 5. And, a central hole 6 is provided at the central position.

Figure 2A:
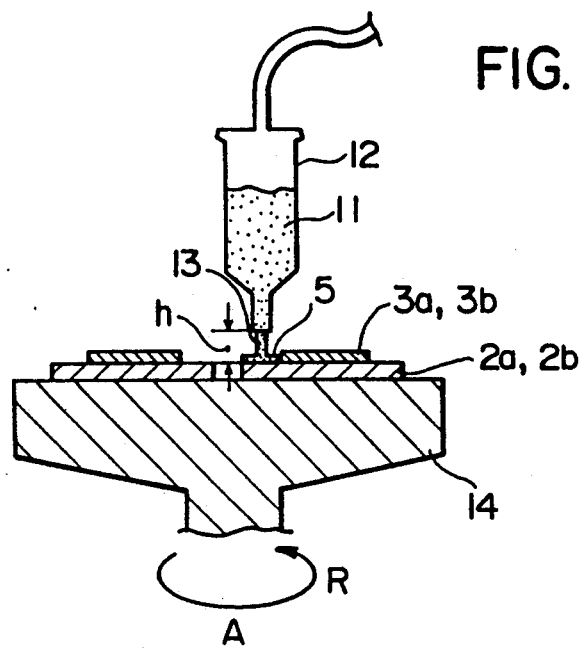
FIG. 2(a) and FIG. 2(b) are cross sectional views schematically showing a step of applying adhesive composition application.
Figure 2B:
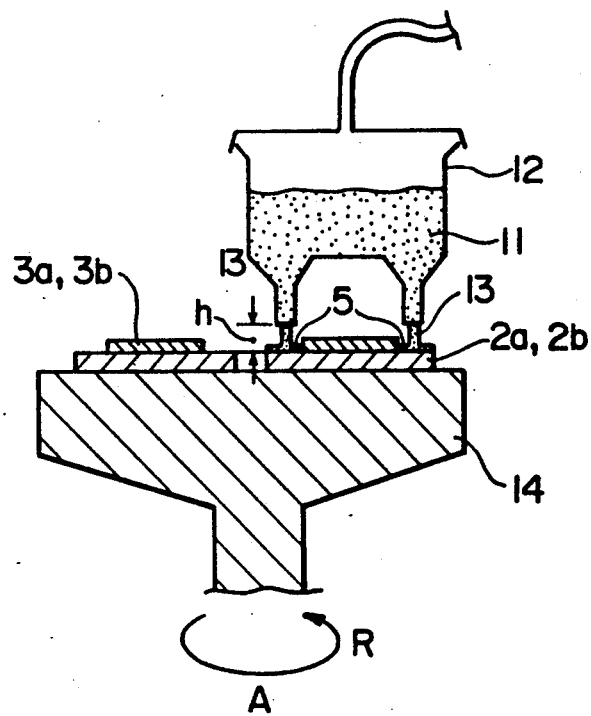

FIGS. 2(a) and 2(b) schematically show a step of applying a hot-melt adhesive composition onto the surface of a disk substrate on the recording layer side by nozzle of a dispenser.

Figure 3A:
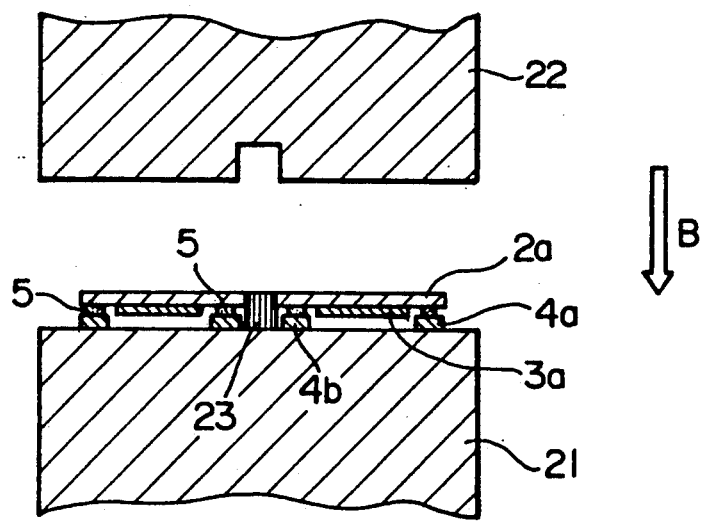
FIG. 3(a) and FIG. 3(b) are cross sectional views schematically showing a step of adhering disks to each other.
Figure 3B:
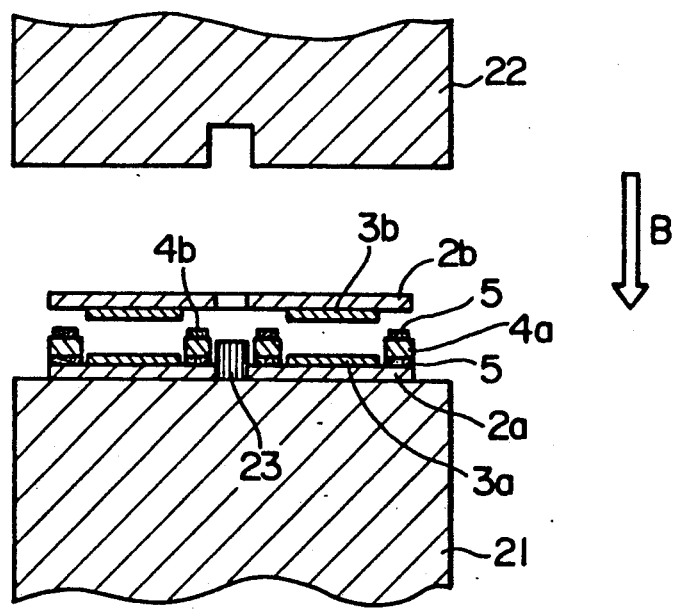

FIGS. 3(a) and 3(b) schematically show a step of adhering disk substrates to which a hot-melt adhesive composition is applied by means of compression of an ordinary-temperature press apparatus.

In FIG. 2(a), numeral 11 indicates a hot-melt adhesive composition, and the dispenser has a barrel in which the hot-melt adhesive composition 11 is reserved. A needle nozzle 13 is disposed at an ejecting portion of the barrel 12, and a rotary stage 14 is disposed thereunder. The rotary stage 14 adsorbs the disk substrate 2a, 2b by a vacuum chuck and rotates it in the A direction. At this time, the adhesive composition 11 reserved in the barrel 12 is ejected through the needle nozzle 13 to form the adhesive layer 5. The rotary stage 14 is so structured as to prevent deviation caused by rotation. In the present invention, the preferred thickness of the adhesive layer is 10 to 300 μm. The thickness of the adhesive layer 5 can be adjusted by means of a distance h between that needle nozzle 13 of the barrel 12 which is movable upwardly and downwardly and the disk substrate 2a, 2b, and the number of rotation of the rotary stage 14. The emission of the adhesive composition 11 can be carried out by feeding it under gas pressure or mechanically feeding it with a pump. This embodiment shows a case of feeding using nitrogen as a gas. FIG. 2 shows independent application of the adhesive composition 11 in which the adhesive composition is independently applied to a portion to which the outer ring-form spacer 4a is adhered and to a portion to which the inner ring-form spacer 4b is adhered. In this case, the barrel 12 is also structured so as to move in the radial direction of the disk. FIG. 2(b) shows an improved structure of the barrel 12 with which to apply the adhesive composition 11 to both of those two portions at the same time so that the inner and outer ring-form spacers 4a and 4b are attached simultaneously.

The disk substrate 2a having the adhesive layer 5 formed as above is set at a positioning pin 23 of that fixed lower mold 21 of an ordinary-temperature press apparatus shown in FIG. 3(a) on which the ring-form spacers 4a and 4b are arranged. Then, the disk substrate 2a is adhered to the ring-form spacers 4a and 4b under compression by moving a movable upper mold 22 in the B direction. The adhesive layer 5 is hardened by cooling it to a temperature of not higher than the melting temperature of the adhesive composition 11, whereby the disk substrate 2a and the ring-form spacers 4a and 4b are adhered together. Further, the adhesive composition 11 is similarly applied onto the ring-form spacers 4a and 4b of the disk substrate 2a according to a method shown in FIG. 2. Thereafter, the disk substrate 2a is set on the fixed lower mold 21 as shown in FIG. 3(b), and the substrate 2b is set such that the recording layer 3b faces the disk substrate 2a and adhered thereto under compression by moving the movable upper mold 22 in the B direction, whereby the information recording medium 1 is produced.

In addition, the information recording medium 1 may be produced by adhering the disk substrates 2a and 2b directly to each other with the hot-melt adhesive composition 11 without using the ring-form spacers 4a and 4b in between.

EXAMPLES

A variety of adhesive compositions according to this invention and comparative adhesive compositions were subjected to environmental tests under conditions of a temperature of 80° C. and a humidity of 85%, and appearance and change ratio of warpage (mrad) (after test/before test) after 500 hours were evaluated.

$$\text{Change ratio of warpage (mrad)} = \frac{\text{warpage after test (after 500 hrs)}}{\text{warpage before test (initial stage)}}$$

Further, the cold-temperature adhesive property was evaluated by carrying out a dropping test in which information recording media were dropped from a height of 76 cm 30 times each at 0° C. and degree of peeling at the adhered portion was observed. The melt-viscosity was measured by using an Emila rotary viscometer at 170° C. at a shear rate of 1.76 sec$^{-1}$.

EXAMPLE 1

There was used a hot-melt adhesive composition which contained 24.4% by weight of a maleic anhydride-graft modified product (maleic anhydride content: 1.5% by weight) of ethylene/propylene copolymer having an ethylene content of 35% by weight and a propylene content of 65% by weight, 8% by weight of a random polypropylene resin having an ethylene unit content of 5% by weight, and a propylene unit content of 95% by weight, 10% by weight of an ethylene/ethyl acrylate resin having an ethyl acrylate content of 25% by weight, 9.6% by weight of a hydrogenation product of a styrene/butadiene/styrene copolymer (SEBS copolymer) having a styrene content of 38% by weight, 9.6% by weight of a polyisobutylene having a number average molecular weight of about 80,000 and 38.4% by weight of an aliphatic cyclic resin (aliphatic petroleum resin) having a number average molecular weight of about 500.

As a transparent resin substrate, there was used a resin which was prepared by copolymerization of ethylene with 1,4,5,8-dimethano-1,2,3,4,4a,5,8,8a-octahydronaphthalene

and had an ethylene content, measured by $^{13}$C-NMR, of 62 mol %, MFR (260° C.) of 35 g/10 minutes, an intrinsic viscosity [η], measured in decalin at 135° C., of 0.47 dl/g and TMA of 148° C. As a ring-form spacer, there were used spacers made of a polycarbonate resin and having a thickness of 0.5 mm. A Te film was used as an optical memory layer.

An information recording medium 1 as described above was prepared from the above adhesive composition and components according to the aforedescribed production process, and subjected to the above environmental test. The adhesive layer had a thickness of 120 μm. Table 1 shows the results.

EXAMPLE 2

Example 1 was repeated except that the hot-melt adhesive composition was replaced with a hot-melt adhesive composition which contained 14.4% by weight of a maleic anhydride-modified product (maleic anhydride content: 1.5% by weight) of an ethylene/propylene copolymer having an ethylene content of 35% by weight and a propylene content of 65% by weight, 8% by weight of a random polypropylene resin having an ethylene unit content of 5% by weight and a propylene unit content of 95% by weight, 10% by weight of an ethylene/ethyl acrylate resin having an ethyl acrylate content of 25% by weight, 19.6% by weight of an maleic anhydride-modified product (maleic anhydride content: 1.0% by weight) of SEBS copolymer (a hydrogenation product of a styrene/butadiene/styrene copolymer) having a styrene content of 38% by weight, 9.6% by weight of a polyisobutylene having a number average molecular weight of 80,000 and 38.4% by number of an aliphatic cyclic resin (aliphatic petroleum resin) having a weight average molecular weight of about 500. Table 1 shows the results.

TABLE 1

|  | Example 1 | Example 2 |
|---|---|---|
| Melt-viscosity (cps) | 120,000 | 100,000 |
| Change ratio of warpage (mrad) | 1.0 | 0.98 |
| Dropping test at low-temperature | no change | no change |

The information recording media in Test Examples 1 and 2 according to this invention comprised, as an adhesive composition with which to adhere disk substrates, a hot-melt adhesive which contained the ethylene/propylene copolymer (A), the polypropylene resin (B), the ethylene/ethyl acrylate resin (C), the styrene-type resin (D), the polyisobutylene resin (E) and the aliphatic cyclic resin (aliphatic petroleum) (F) provided that at least one of the components (A) to (F) was modified with an unsaturated carboxylic acid or its derivative. For this reason, as shown in Table 1, application of the adhesive composition was easily carried out, and, even if the information recording media were left to stand under high-temperature, high-humidity conditions or under low-temperature conditions for a long period of time, deviation and peel did not occur between two disk substrates adhered to each other, and deformation of the media was small.

EXAMPLE 3

An adhesive composition containing 100 parts by weight of a hot-melt adhesive and 10 parts by weight of a hydrophobic silica (tradename of R-972, supplied by Nippon Aerosil K.K., average particle diameter 0.017 μm) was used. The above hot-melt adhesive contained 18% by weight of a maleic anhydride-modified product (maleic anhydride content: 1% by weight) of an ethylene/propylene copolymer having an ethylene content of 35% by weight and a propylene content of 65% by weight, 10% by weight of an ethylene/propylene random copolymer having an ethylene unit content of 5% by weight and a propylene unit content of 95% by weight, 12% by weight of an SEBS resin copolymer having a styrene content of 38% by weight, 12% by weight of polyisobutylene having a number average molecular weight of 80,000 and 48% by weight of an aliphatic cyclic resin (aliphatic petroleum resin) having a number average molecular weight of 500.

As a transparent resin substrate, there was used a resin which was prepared by copolymerization of ethylene with 1,4,5,8-dimethano-1,2,3,4,4a,5,8,8a-octahydronaphthalene and had an ethylene content, measured by $^{13}$C-NMR, of 62 mol %, MFR (260° C.) of 35 g/10 minutes, an intrinsic viscosity [η], measured in decalin at 135° C., of 0.47 dl/g and TMA of 148° C. As a ring-form spacer, there were used spacers made of a polycarbonate resin and having a thickness of 0.5 mm. A Te film was used as an optical memory layer. The adhesive layer had a thickness of 120 μm.

An information recording medium 1 as described above was prepared from the above adhesive composition and components according to the aforedescribed production process, and subjected to the above environmental test. Table 2 shows the results.

EXAMPLE 4

Example 3 was repeated except for use of an adhesive composition containing 100 parts by weight of the same hot-melt adhesive as that used in Test Example 3 and 30 parts by weight of a mica (100M, tradename, supplied by Yamada Mica Kogyosho, average particle diameter 100 to 200 μm). Table 2 shows the results.

EXAMPLE 5

Example 3 was repeated except for use of an adhesive composition containing 100 parts by weight of the same hot-melt adhesive as that used in Test Example 3, 50 parts by weight of calcium carbonate (Escalon #200, tradename, supplied by Sankyo Seifun K.K., average particle diameter 2.0 μm) and 0.1 part by weight of talc (JA13R, tradename, supplied by Asada Seifun K.K.). Table 2 shows the results.

TABLE 2

|  | Example 3 | Example 4 | Example 5 |
|---|---|---|---|
| Melt-viscosity (cps) | 50,000 | 57,000 | 53,000 |
| Change ratio of warpage (mrad) | 1.00 | 0.98 | 1.10 |

The information recording media in Examples 3 to 5 according to this invention comprised an adhesive composition containing a hot-melt adhesive and filler(s) to adhere the disk substrates to each other. Therefore, the adhesive composition had high thixotropic properties and application thereof was easily carried out. And, even if the information recording media were allowed to stand under high-temperature, high-humidity conditions for a long period of time, no deviation occurred between the two substrates, and deformation such as warpage was small.

What is claimed is:

1. An information recording medium formed by adhering, with an adhesive composition, two disk substrates to each other, at least one of the two disk substrates having a recording layer on at least one surface of a transparent thermoplastic resin substrate thereof and the adhesive composition comprising the following components (A) to (D):
   (A) 1 to 68% by weight of an α-olefin polymer, said α-olefin polymer being a mixture containing 1 to 60% by weight of an ethylene/propylene copolymer, 1 to 60% by weight of a propylene polymer and 1 to 30% by weight of an isobutylene polymer,
   (B) 1 to 30% by weight of an ethylene/(meth)acrylate copolymer,
   (C) 1 to 30% by weight of a styrene-type polymer, and
   (D) 30 to 95% by weight of a tackifier provided that at least one of the components (A) to (D) is modified with an unsaturated carboxylic acid or a derivative thereof.

2. An information recording medium according to claim 1, wherein the tackifier is an aliphatic cyclic resin.

3. An information recording medium according to claim 1, wherein the ethylene/(meth)acrylate copolymer is an ethylene/ethyl acrylate copolymer.

4. An information recording medium according to claim 1, wherein the ethylene/propylene copolymer contains 5 to 80% by weight of ethylene polymer units.

5. An information recording medium according to claim 1, wherein the propylene polymer is a homopolymer of propylene or a copolymer of propylene with an α-olefin having 4 to 20 carbon atoms.

6. An information recording medium according to claim 1, wherein the isobutylene polymer is a homopolymer of isobutylene or a copolymer of isobutylene with ethylene.

7. An information recording medium according to claim 1, wherein the ethylene/(meth) acrylate copolymer (B) contains 1 to 50% by weight of ethyl acrylate polymer units.

8. An information recording medium according to claim 1, wherein the styrene-type polymer (C) is at least one member selected from the group consisting of polystyrene, a styrene/butadiene/styrene copolymer and hydrogenation product thereof, a styrene/acrylonitrile copolymer, a styrene/α-methylstyrene copolymer, a styrene/maleic anhydride copolymer, a styrene/methyl methacrylate copolymer, a styrene/N-phenylmaleimide copolymer, a styrene/α-methylstyrene/acrylonitrile copolymer, a styrene/acrylonitrile/methyl methacrylate copolymer, a styrene/maleic anhydride/acrylonitrile copolymer and blends of these with rubbery elastomers.

9. An information recording medium according to claim 1, wherein the tackifier (D) is at least one member selected from the group consisting of rosin and its derivatives, terpene-containing resins, a cyclopentadiene polymer, and a petroleum resin.

10. An information recording medium according to claim 1, wherein the α-olefin polymer (A) is a component which is modified with an unsaturated carboxylic acid or its derivative.

11. An information recording medium according to claim 1, wherein the transparent resin substrate is formed of a copolymer(s) of ethylene with a cycloolefin of the following formula (I)

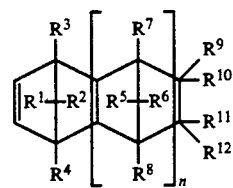

(I)

wherein $R^1$ to $R^8$ may be same or different and each is a hydrogen atom, halogen atom or hydrocarbon group, $R^9$ to $R^{12}$ may be same or different and each is a hydrogen atom, halogen atom or hydrocarbon group, or a combination of $R^9$ and $R^{10}$ or $R^{11}$ and $R^{12}$ can be a divalent hydrocarbon group and a combination of $R^9$ or $R^{10}$ and $R^{11}$ or $R^{12}$ may form a ring, and n is zero or a positive integer, provided that when n is 2 or more, a plurality of $R^5$, a plurality of $R^6$, a plurality of $R^7$ or a plurality of $R^8$ may be the same or different.

12. An information recording medium according to claim 11, wherein the copolymer(s) has an intrinsic viscosity, measured in decalin at 135° C., of 0.01 to 10 dl/g.

13. An information recording medium according to claim 11, wherein the copolymer(s) has a softening temperature of not less than 70° C.

14. An information recording medium according to claim 1, wherein the adhesive composition contains 5 to 50% by weight of the α-olefin polymer (A), 5 to 20% by weight of the ethylene/(meth)acrylate polymer (B), 5 to 20% by weight of the styrene-type polymer (C), and 35 to 70% by weight of the tackifier (D).

15. An information recording medium according to claim 1, which is an optical recording medium.

16. An information recording medium according to claim 1 wherein the α-olefin polymer (A) comprises 5 to 40% by weight of the ethylene/propylene copolymer, 5 to 40% by weight of the propylene copolymer and 5 to 20% by weight of the isobutylene polymer.

17. An information recording medium according to claim 16 wherein the ethylene/propylene copolymer contains 5 to 80% by weight of ethylene polymer units, the propylene polymer is a homopolymer of propylene or a copolymer of propylene with an α-olefin having 4 to 20 carbon atoms, and the isobutylene polymer is a homopolymer of isobutylene or a copolymer of isobutylene which ethylene.

18. An information recording medium according to claim 1 wherein the adhesive composition has a melt-viscosity at 170° C., of 20,000 to 200,000 cps, measured at shear rate of 17.6 sec$^{-1}$ and a softening point of from 140° to 200° C.

19. An information recording medium formed by adhering, with an adhesive composition, two disk substrates individually having a recording layer on at least one surface of a transparent thermoplastic resin substrate thereof to each other, the adhesive composition comprising the following components:

(A) an α-olefin polymer,
(C) a styrene-type polymer,
(D) a tackifier, and
(E) fine filler particles.

20. An information recording medium according to claim 19, wherein the α-olefin polymer is an α-olefin homo- or copolymer modified with an unsaturated carboxylic acid or a derivative thereof.

21. An information recording medium according to claim 19, wherein the α-olefin polymer (A) is a mixture of an ethylene/propylene copolymer, a propylene polymer and an isobutylene polymer.

22. An information recording medium according to claim 19, wherein the fine filler particles (E) are organic or inorganic ones having a particle diameter of not more than 100 μm.

23. An information recording medium according to claim 19, wherein the adhesive composition contains 1 to 60% by weight of the α polymer (A), 1 to 30% by weight of the styrene-type polymer (C), 30 to 95% by weight of the tackifier (D) and 1 to 50% by weight of the fine filler particles (E).

24. An information recording medium according to claim 19, wherein the adhesive composition contains 5 to 50% by weight of the α-olefin polymer (A), 5 to 20% by weight of the styrene-resin polymer (C), 45 to 90% by weight of the tackifier (D) and 5 to 35% by weight of the fine filler particles (E).

25. An information recording medium according to claim 24, wherein the α-olefin polymer (A) is a mixture of an ethylene/propylene copolymer, a propylene polymer and an isobutylene polymer.

26. An information recording medium according to claim 25, wherein the α-olefin polymer (A) comprises from 1 to 60% by weight of the ethylene/propylene copolymer, 1 to 60% by weight of the propylene copolymer and 1 to 30% by weight of the isobutylene polymer.

27. An information recording medium according to claim 25, wherein the α-olefin polymer (A) comprises 5 to 40% by weight of the ethylene/propylene copolymer, 5 to 40% by weight of the propylene copolymer and 5 to 20% by weight of the isobutylene polymer.

28. An information recording medium according to claim 25, wherein the ethylene/propylene copolymer contains 5 to 80% by weight of ethylene polymer units, the propylene polymer is a homopolymer of propylene or a copolymer of propylene with an α-olefin having 4 to 20 carbon atoms, and the isobutylene polymer is a homopolymer of isobutylene or a copolymer of isobutylene with ethylene.

29. An information recording medium according to claim 19, wherein the adhesive composition before incorporation of the fine filler particles (E) has a melt-viscosity of at least 20,000 cps and after addition of the fine filler particles (E) has a melt-viscosity, at 170° C., of 30,000 to 100,000 cps, the melt-viscosity being measured at a shear rate 17.6 sec$^{-1}$.

* * * * *